United States Patent [19]

Watanabe

[11] Patent Number: 4,540,619
[45] Date of Patent: Sep. 10, 1985

[54] THERMALLY SHRINKABLE LABELING BAND

[75] Inventor: Kozo Watanabe, Kurobe, Japan

[73] Assignee: Yoshida Kogyo K. K., Tokyo, Japan

[21] Appl. No.: 639,482

[22] Filed: Aug. 10, 1984

[30] Foreign Application Priority Data

Aug. 11, 1983 [JP] Japan ................... 58-124966

[51] Int. Cl.³ ............... B32B 3/00; B32B 7/00
[52] U.S. Cl. .................. 428/192; 428/194; 428/211; 428/913
[58] Field of Search ............ 428/192, 194, 211, 913

[56] References Cited

U.S. PATENT DOCUMENTS 3,607,602  9/1971  Greskiewicz et al. ........... 428/913
4,461,793  7/1984  Blok et al. ...................... 428/913

Primary Examiner—William J. Van Balen
Attorney, Agent, or Firm—Hill, Van Santen, Steadman & Simpson

[57] ABSTRACT

A labeling band adapted to be thermally fastened around one or more products includes a pair of strips joined together along marginal end portions thereof. One of the strips is made of printable, thermally non-shrinkable material while the other strip is made of thermally shrinkable material. When the band is subjected to heat with the products being encircled by the band, the other strip is thermally shrunk to thereby enable the band to firmly hold the products together. Characters printed on the thermally non-shrinkable strip are free from distortion and hence can clearly indicate product information of the products bound by the band.

3 Claims, 11 Drawing Figures

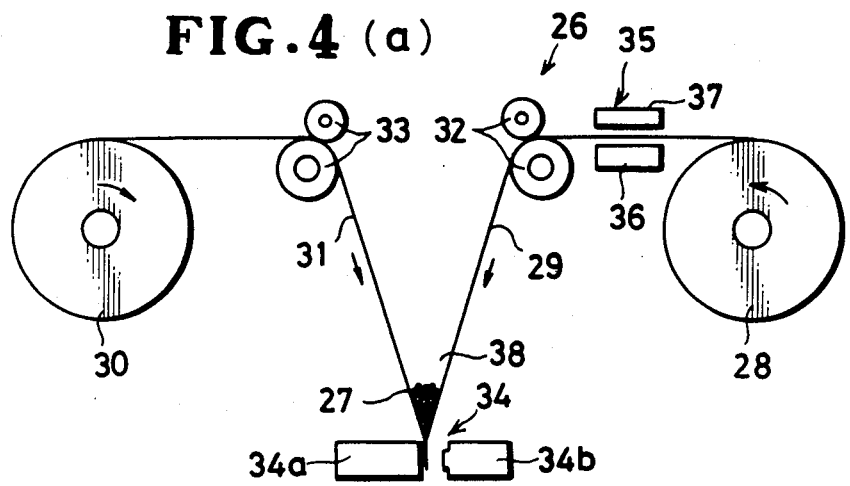
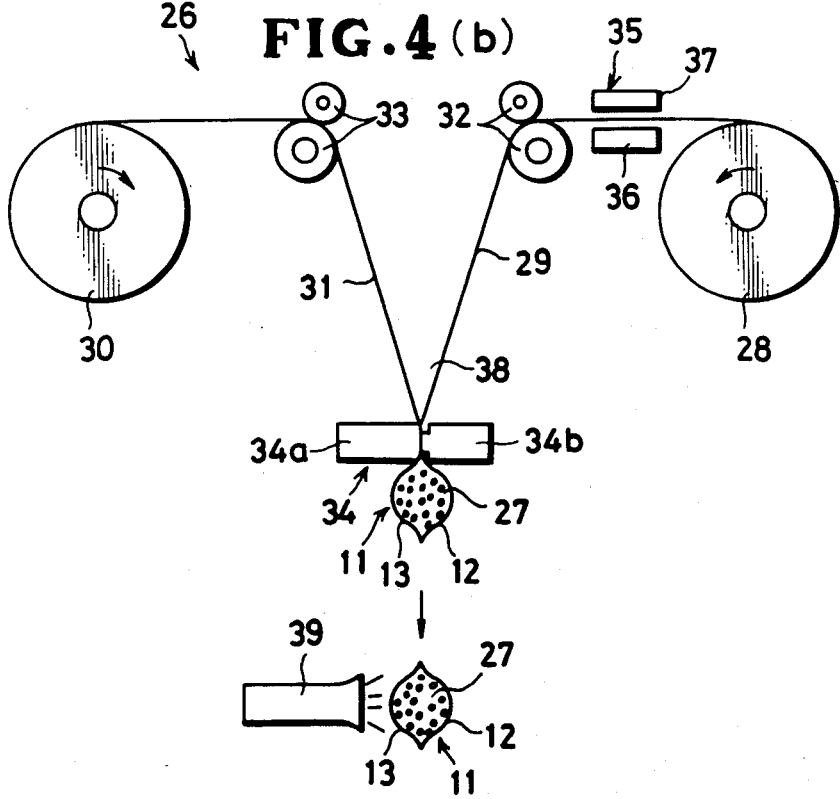

4,540,619

THERMALLY SHRINKABLE LABELING BAND

BACKGROUND OF THE INVENTION

1. Field of the Invention

The present invention relates to a thermally shrinkable labeling band adapted to be partially heat-shrunk around one or more products to designate product information of the product bound by the band.

2. Prior Art

In the manufacture of slide fasteners, each group of finished slide fasteners is bound into a bundle by a binding strip or band having on its front surface various characters indicative of product information such as the type, size, color, quantities, etc. of the bundle. The band is composed of a single strip of thermally shrinkable synthetic resin such as vinyl chloride or polyethylene, and requires a special printing equipment for providing clear characters on the synthetic resin band. The characters printed on the band are likely to be distorted and become unclear as the band is thermally shrunk. Since the bundle of slide fasteners is flexible, printing on the band fastened around such flexible slide fasteners is tedious and not suitable for an automated high speed production.

SUMMARY OF THE INVENTION

It is therefore an object of the present invention to provide a thermally shrinkable labeling band which can have easily printed thereon various characters indicative of produce information of one or more products bound by the band and is partially heat-shrinkable around the products to firmly hold them together without causing any distortion of the characters.

Another object of the present invention is to provide a thermally shrinkable labeling band having printed characters which are protected from being stained.

According to the present invention, a labeling band adapted to be thermally fastened around one or more products, has at least a pair of adjoining portions. One of the portions is made of printable, thermally non-shrinkable material whereas the other portion is made of thermally shrinkable material. When subjected to heat, the other portion is shrunk to thereby enable the band to firmly bind the products together. Characters printed on the thermally non-shrinkable portion remain clear and are protected from being distorted.

Many other advantages and features of the present invention will become manifest to those versed in the art upon making reference to the detailed description and the accompanying sheets of drawings in which preferred structural embodiments incorporating the principles of the present invention are shown by way of illustrative example.

BRIEF DESCRIPTION OF THE DRAWINGS

FIG. 4(a) is a diagrammatic front elevational view of an apparatus for binding products by means of the labeling band of FIG. 1, the view showing the apparatus in pre-binding position;

FIG. 4(b) is a view similar to FIG. 4(a), showing the apparatus in binding position;

DETAILED DESCRIPTION

Figure 1:
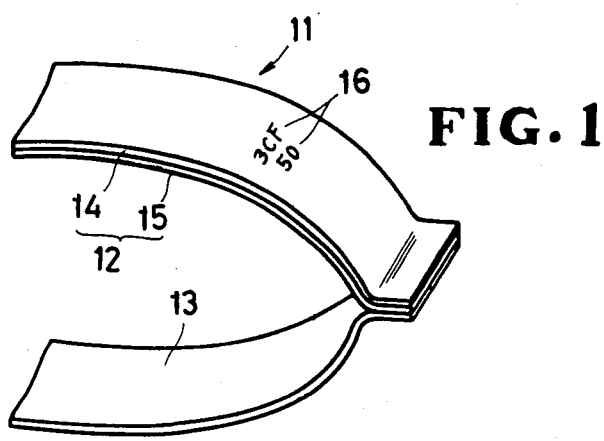
FIG. 1 is a fragmentary perspective view of a thermally shrinkable labeling band according to the present invention.

As shown in FIG. 1, a labeling band 11 embodying the invention comprises a pair of upper and lower strips 12, 13 bonded or otherwise fused together along marginal end portions thereof. The upper strip 12 is made of thermally non-shrinkable material while the lower strip 13 is made of thermally shrinkable material such as vinyl chloride, polyethylene or the like. The upper strip 12 is composed of a sheet 14 of paper and a film 15 of thermally non-shrinkable synthetic resin laminated to the underside of the paper sheet 14, the film 15 being joined with the lower strip 13. The upper strip 12 has various characters 16 printed on the front surface of the paper sheet 14 for indicating product information such as the type, size, color, quantities, etc. of at least one product to which the band 11 is to be fastened. The characters 16 may be printed during the course of application of the band 11 to the product. The band 11 thus constructed is looped around the product and then the marginal end portions of the strips 12, 13 are bonded or otherwise fused together. When the band 11 is subjected to a heating medium such as hot air, the thermally shrinkable lower strip 13 contracts to enable the band 11 to firmly fit around the product. The thermally non-shrinkable upper strip 12 maintains its original size to thereby prevent the characters 16 from being deformed.

Figure 2:
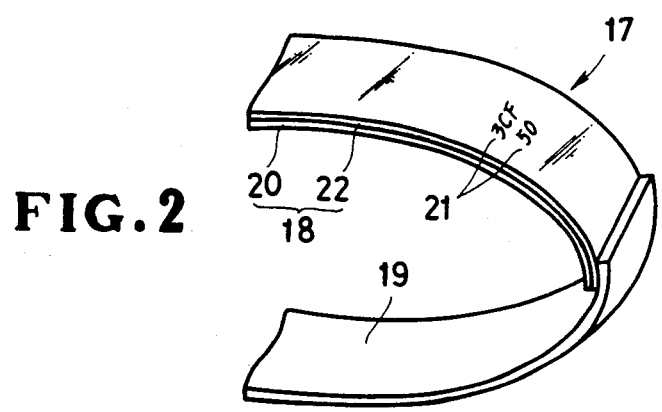
FIG. 2 is a view similar to FIG. 1, showing a modified labeling band.

FIG. 2 shows a modified band 17 which comprises an upper strip 18 of printable, thermally non-shrinkable material joined along one marginal end portion with a marginal end portion of a lower strip 19 of thermally shrinkable material such as vinyl chloride or polyethylene. The upper strip 18 is composed of a sheet 20 of paper having reference characters 21 printed on the upper surface of the paper sheet 20, and a transparent film 22 of thermally non-shrinkable synthetic resin coated onto the printed surface of the paper sheet 20. The marginal end portion of the lower strip 19 laps over the end edge of the synthetic resin film 22 and is bonded or otherwise fused with the latter. With the band 17 looped around at least one product, the marginal end portions of the strips 18, 19 are bonded or otherwise fused together. Then the band 17 is heated by hot air whereupon the thermally shrinkable lower strip 19 is shrunk to thereby enable the band 17 to firmly fit around the product. The thermally non-shrinkable upper strip 18 is however dimensionally unchanged so that the reference characters 21 are protected from becoming distorted and unclear. The transparent synthetic resin film 22 serves to reinforce the paper sheet 20 and to protect the same from stains on the characters 21.

Figure 3:
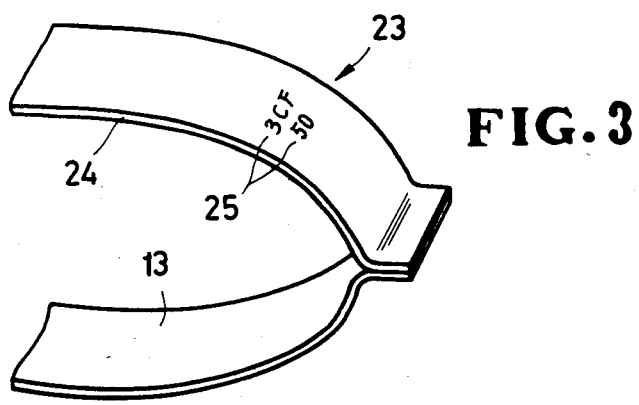
FIG. 3 is a view similar to FIG. 1, showing another modified labeling band.

A modified band 23 shown in FIG. 3 is substantially the same as the band 11 of FIG. 1 with the exception that an upper strip 24 of the band 23 is composed of a single layer of printable, thermally non-shrinkable material. Reference characters 25 may be printed prior to or during the course of the application of the band 23 to a product.

The thermally shrinkable bands 11, 17, 23 of the invention are particularly useful for bundling elongated products. FIGS. 4(a) and 4(b) show an apparatus 26 for binding products 27 into bundles by means of a plurality of the bands 11 shown in FIG. 1.

The binding apparatus 26 comprises a first reel 28 from which a continuous strip 29 of printable, thermally non-shrinkable material is supplied, a second reel 30 from which a continuous strip 31 of thermally shrinkable material is supplied, the strips 29, 31 being the same in structure and material as the strips 12, 13, respectively, of FIG. 1. Two pairs of feed rollers 32, 33 are disposed downstream of the reels 28, 30, respectively, and synchronously drivable to intermittently feed the respective strips 29, 31 toward a heat-sealing unit 34. The unit 34 has a conventional structure and includes an anvil 34a and an ultrasonic horn 34b disposed opposite to the anvil 34a, the anvil 34a and the ultrasonic horn 34b being relatively movable toward each other to unite end portions of the strips 29, 31 across the widths thereof, thereby forming a labeling strip of continuous length. The heat-sealing unit 34 further includes a cutting blade (not shown) coacting with one of the anvil 34a and the ultrasonic horn 34b transversely across the strips to sever the strips 29, 31 centrally through one welded or fused portion. Thus, repeated actuation of the heat-sealing unit 34 will produce a plurality of the bands 11 of individual length from the continuous labeling strip. A printing unit 35 is disposed between the pair of feed rollers 32 and the reel 28 and it includes a printing plate 36 and a platen 37 confronting to the printing plate 36 with the strip 29 extending between the printing plate 36 and the platen 37. The platen 37 is movable toward the plate 36 to form the strip 29 against the printing plate 36 for printing on the strip 29 various characters indicative of product information such as the type, size, color, quantities, etc. of the products 27. The printing plate 36 is disposed on the side of the strip 29 which is exposed to view when the strip 29 is fastened around the products 27. A hot-air blower 39 (FIG. 4(b)) is disposed downstream of the heat-sealing unit 34 for forcing hot air against the strip 13 of each of the severed bands 11.

In operation, the heat-sealing unit 34 is actuated to unite the strips 29, 31 along the leading edges thereof which have been introduced between the anvil 34a and the ultrasonic horn 34b. (This step normally is a part of the previous heat-seal before it is severed.) The strips 29, 31 thus united jointly form a V-shaped pocket 38 for receiving therein the products 27. When a predetermined amount of products 27 is stacked in the pocket 38, the feed rollers 32, 33 are rotated to advance the respective strips 29, 31 for a predetermined distance. The heat-sealing unit 34 is again actuated to unite the strips 29, 31 at a point diametrically opposite to the welded leading end edges thereof to form one of the bands 11 looping around the products 27. Substantially at the same time or slightly thereafter, the cutting blade of the heat-sealing unit 34 severs the band 11 from the continuous labeling strip. The band 11 thus severed is subjected to hot air ejected from the blower 39, whereupon the strip 31 is thermally shrunk to thereby enable the band 11 to firmly hold the products 27 together. Each time the strips 29, 31 are at rest, the platen 37 is actuated to press the strip 29 against the printing plate 36 for printing various characters on the strip 29.

The band 23 of FIG. 3 can be used on the apparatus 26 for bundling the products 27.

Figure 5:
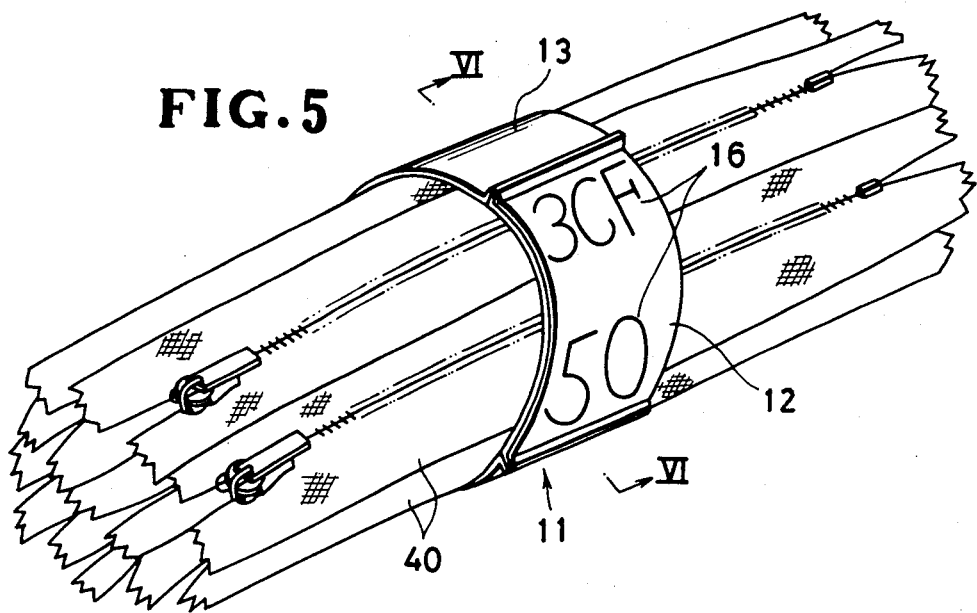
FIG. 5 is an enlarged schematic perspective view of a group of slide fasteners loosely bound by the labeling band of FIG. 1, the view showing the band before being thermally shrunk.
Figure 6:
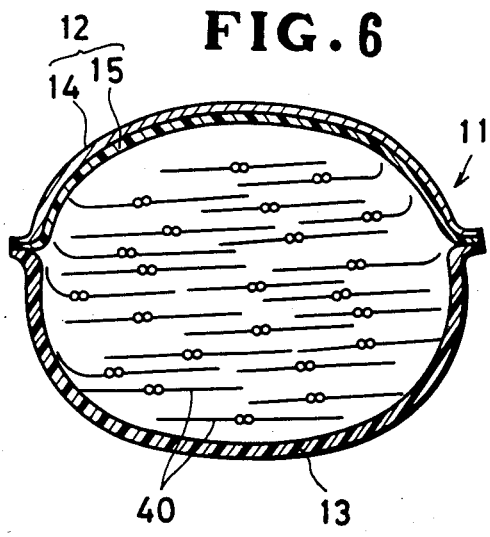
FIG. 6 is a cross-sectional view taken along line VI—VI of FIG. 5.
Figure 7:
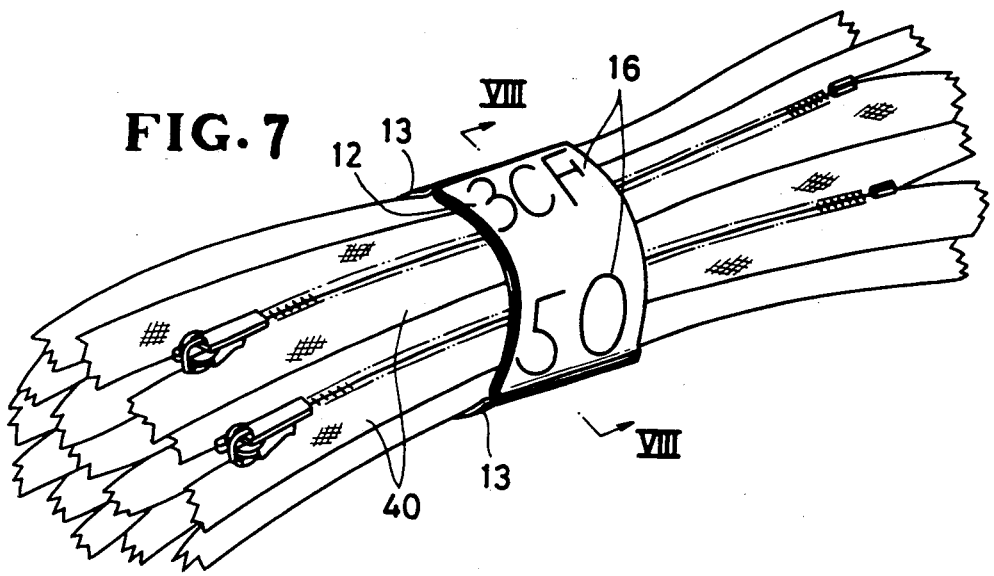
FIG. 7 is a view similar to FIG. 5, showing the slide fasteners tightly bound by the band after having been thermally shrunk.
Figure 8:
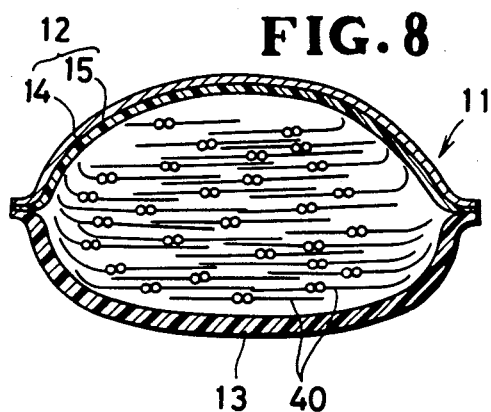
FIG. 8 is a cross-sectional view taken along line VIII—VIII of FIG. 7.

FIGS. 5 through 8 show the manner in which a plurality of finished slide fasteners 40 is bound by the band 11 of FIG. 1. Before the strip 13 is subjected to heat, the slide fasteners 40 are loosely held together by the band 11, as shown in FIGS. 5 and 6. As shown in FIGS. 7 and 8, after thermal shrinking of the strip 13, the band 11 firmly hold the slide fasteners 40. Since the strip 12 is thermally non-shrinkable and hence can maintain its original shape and dimensions, the characters 16 printed on the strip 12 are free from distortion.

Figure 9:
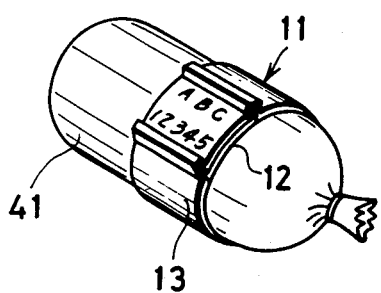
FIG. 9 is a schematic perspective view of a packed produce around which the labeling band of FIG. 1 is fastened.

As shown in FIG. 9, the band 11 of FIG. 1 also can be fastened firmly around a packed cylindrical product 41 by thermal shrinking of the strip 13. The characters 16 on the thermally non-shrinkable strip 12 are clear and free from distortion.

Figure 10:
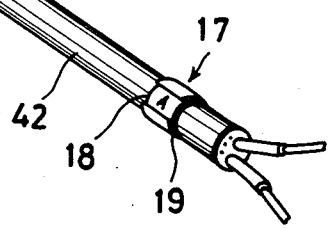
FIG. 10 is a fragmentary schematic perspective view of an electric cord around which the labeling band of FIG. 2 is fastened.

The band 17 of FIG. 2 is used as a marking band for an electric cord 42, as shown in FIG. 10. Due to thermal shrinking of the strip 19, the band 17 is firmly fit around the cord 42. Since the strip 18 is thermally non-shrinkable and has the external transparent film layer (FIG. 2) provided thereon, the band 17 is clear and stain-free.

Although various minor modifications may be suggested by those versed in the art, it should be understood that I wish to embody within the scope of the patent warranted hereon, all such embodiments as reasonably and properly come within the scope of my contribution to the art.

What is claimed is:

1. A labelling band comprising:
   a pair of adjoining strips joined together along marginal end portions thereof, one of said strips being a printable thermally non-shrinkable sheet of paper having a film of synthetic resin laminated to one surface thereof, the other of said strips being made of thermally shrinkable material united with said synthetic resin film.

2. A labeling band according to claim 1, said paper sheet having at least one character printed on the other surface of said paper sheet.

3. A labeling band according to claim 1, said one surface of said paper sheet having at least one character printed thereon, said synthetic resin film being transparent and provided on said one surface of said paper sheet.

* * * * *